(12) United States Patent
Jomain

(10) Patent No.: US 12,296,976 B2
(45) Date of Patent: May 13, 2025

(54) AIRCRAFT FUEL TANK INERTING

(71) Applicant: AIRBUS OPERATIONS LIMITED, Bristol (GB)

(72) Inventor: Pierre Jomain, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1179 days.

(21) Appl. No.: 16/564,428

(22) Filed: Sep. 9, 2019

(65) Prior Publication Data

US 2020/0079522 A1 Mar. 12, 2020

(30) Foreign Application Priority Data

Sep. 10, 2018 (GB) ..................................... 1814679

(51) Int. Cl.
*B64D 37/32* (2006.01)
*B64F 1/28* (2006.01)
*B64F 5/60* (2017.01)

(52) U.S. Cl.
CPC ................ *B64D 37/32* (2013.01); *B64F 1/28* (2013.01); *B64F 5/60* (2017.01)

(58) Field of Classification Search
CPC . B64D 37/32; B64D 37/34; B64F 1/28; B64F 5/60; Y02T 50/40; Y02T 50/80; A62C 3/08
See application file for complete search history.

(56) References Cited

U.S. PATENT DOCUMENTS

| | | | |
|---|---|---|---|
| 6,343,465 B1 | 2/2002 | Martinov | |
| 8,192,532 B1 | 6/2012 | Gupta | |
| 2005/0173017 A1* | 8/2005 | Moravec | B64D 37/32 141/66 |
| 2006/0021652 A1 | 2/2006 | Surawski | |
| 2013/0119202 A1 | 5/2013 | French | |
| 2014/0208943 A1* | 7/2014 | Gupta | B64D 37/32 95/146 |
| 2014/0238501 A1* | 8/2014 | Tichborne | B64D 37/32 137/12 |
| 2015/0151846 A1 | 6/2015 | Haskins et al. | |

(Continued)

FOREIGN PATENT DOCUMENTS

| | | |
|---|---|---|
| EP | 3 037 353 | 6/2016 |
| EP | 3 333 084 | 6/2018 |
| GB | 2520728 | 6/2015 |

OTHER PUBLICATIONS

Combined Search and Examination Report for GB Application No. 1814679.5 dated Feb. 25, 2019, 5 pages.

(Continued)

*Primary Examiner* — Lina Cordero
(74) *Attorney, Agent, or Firm* — Nixon & Vanderhye P.C.

(57) ABSTRACT

A method of determining whether it is necessary to inert an aircraft fuel tank is disclosed including providing a temperature value indicative of a temperature of the fuel (F) in a fuel tank after refueling or indicative of the temperature at the aircraft's predicted departure time and location, and based on the temperature value, determining whether or not it is necessary to inert the aircraft fuel tank. A method of controlling the supply of inerting gas to the fuel tank, and an aircraft fuel tank inerting control system are disclosed.

9 Claims, 9 Drawing Sheets

(56) References Cited

U.S. PATENT DOCUMENTS

| | | | |
|---|---|---|---|
| 2016/0176535 A1* | 6/2016 | Family | A62C 99/0018 |
| | | | 701/3 |
| 2018/0162543 A1 | 6/2018 | Jojic et al. | |
| 2018/0236278 A1* | 8/2018 | Smith | A62C 3/08 |

OTHER PUBLICATIONS

Partial European Search Report for European Application No. EP19195303, 3 pages, Apr. 23, 2020.

* cited by examiner

AIRCRAFT FUEL TANK INERTING

CROSS RELATED APPLICATION

This application claims priority to United Kingdom (GB) Patent Application 1814679.5, filed Sep. 10, 2018, the entire contents of which are hereby incorporated by reference.

BACKGROUND OF THE INVENTION

The present disclosure relates to aircraft fuel tank inerting.

The present invention concerns aircraft fuel tank inerting. More particularly, but not exclusively, this invention concerns a method of determining whether aircraft fuel tank inerting will be required. The invention also concerns a method of controlling the inerting of one or more aircraft fuel tanks, an aircraft fuel tank inerting control system, an aircraft and a software product. The invention also concerns a method of determining whether or not to remove one or more parts of an aircraft fuel tank inerting arrangement, a method of adapting an aircraft and an operational aircraft comprising an aircraft fuel tank inerting arrangement from which one or more components is absent.

It is well-known to those skilled in the art to provide inert gas (typically oxygen-depleted air) to aircraft fuel tanks in order to reduce the likelihood of explosions occurring in the fuel tanks. It is known to provide inert gas to the aircraft fuel tanks during the ascent and descent stages of the flight and not to provide inert air during the cruise stage of a flight. However, such an approach may be rather wasteful of inerting gas and is rather arbitrary in the way in which inerting gas is supplied to the fuel tanks. Furthermore, air separation modules (often called ASMs) or catalysts, both of which are often used to provide oxygen-depleted air, need replacing after a certain amount of use. It is therefore desirable to use such ASMs or catalysts only when needed.

US2006/0021652 describes that inerting gas may be supplied to a fuel tank in a more controlled manner, based on measurements of temperature and pressure outside the fuel tank and sensor measurements inside the fuel tank. GB2520728 describes the supply of inerting gas based on flight parameters, such as ascent rate, descent rate, altitude and attitude, and on sensor outputs, such as the output of gas sensors located in the fuel tank. Such arrangements are based on instant measurements and readings and do not take into account projected aircraft conditions, nor do they take into account the temperature of the fuel itself.

EP3037353 describes control of an inerting system based on the temperature at the aircraft's destination.

The present invention seeks to mitigate the above-mentioned problems. Alternatively or additionally, the present invention seeks to provide an improved method of determining whether inerting of one or more fuel tanks is required and/or an improved method of controlling an aircraft fuel tank inerting system.

SUMMARY OF THE INVENTION

In accordance with a first aspect of the present invention, there is provided a method of determining whether it is necessary to inert a refueled aircraft fuel tank containing fuel, the method comprising providing a temperature value indicative of a temperature of the fuel after refueling, and based on said temperature value, determining whether or not it is necessary to inert the aircraft fuel tank.

The applicant has discovered that it is possible to use the temperature of the fuel at fueling to determine whether or not it will be necessary to inert a fuel tank during flight. It may, therefore, be possible to deactivate the fuel tank inerting system for the whole of a flight, saving energy and fuel. Therefore, the method may comprise determining whether or not it is necessary to inert the aircraft fuel tank for substantially all of the immediately forthcoming flight (i.e. the next flight).

Those skilled in the art will realise that refueling itself is not necessarily part of the method of the present invention.

The phrase "after refueling" is typically indicative of the temperature of the fuel immediately after refueling, and typically before movement of the aircraft (such as push-back from a stand or taxiing).

The temperature value indicative of a temperature of the fuel after refueling may be a measured temperature value or a predicted temperature value. For example, providing said temperature value may comprise measuring a temperature of the fuel in the fuel tank before, during or after the fueling process. The method may therefore comprise measuring a temperature that is indicative of a temperature of the fuel after refueling. Such measurement would typically occur before commencing a flight (for example, before take-off). Providing said temperature value may comprise measuring a temperature of the fuel before it is provided to the fuel tank, for example, in a fueling bowser, in a fueling conduit (for example, between a fueling bowser and the aircraft fuel tank) or in a fuel storage facility (for example, in a static fuel dump). Providing said temperature may comprise measuring an ambient atmospheric temperature. As mentioned above, the temperature value indicative of a temperature of the fuel after refueling may be a predicted temperature value. Such a predicted value may be based on a measured value; for example, a measured value of temperature may be taken at a first point in time (for example, a temperature of the fuel measured in a fueling bowser), and a predicted temperature value derived from that measured value, knowing, for example, the thermal history of the fuel subsequent to the taking of the measured temperature value. For the avoidance of doubt, the indicative temperature may be the measured temperature of the fuel. The method may comprise measuring the temperature of the fuel.

The method may optionally comprise providing refueling fuel to a fuel tank containing existing fuel. The method may optionally comprise providing a first temperature value indicative of the temperature of refueling fuel provided to the fuel tank during refueling, providing a second temperature value indicative of the temperature of the existing fuel present in the fuel tank prior to refueling and determining whether or not it is necessary to inert the fuel tank based on the first and second temperature values.

The method may further comprise providing a first volume value indicative of the volume of the refueling fuel delivered to the fuel tank and a second volume value being indicative of the volume of existing fuel, and determining whether or not it is necessary to inert the fuel tank based on the first and second volume values and the first and second temperature values.

Determining whether or not it is necessary to inert the fuel tank may comprise comparing said temperature value with a predetermined temperature value. The predetermined value may be related to a property of the aircraft fuel, such as a flammability limit of the aircraft's fuel, for example, a lower flammability limit. The comparison may comprise calculating a difference between the predetermined value and the indicative temperature. For example, if the indicative temperature is lower than the predetermined value (for example, a fuel lower flammability limit) by at least a certain margin (such as 5-10° C., for example), then this may be indicative of there being no need to provide the fuel tank with inerting gas. If the indicative temperature is not lower than the predetermined value by said margin, this may be indicative of there being a need for inerting gas to be supplied to the fuel tank. Those skilled in the art will realise that more complex mathematical relationships may be used. For example, one or both of a factor or power may be applied to the indicative temperature and/or the predetermined value.

Determining whether or not it is necessary to inert the fuel tank may optionally comprise considering one or more flight-related parameters, such as, predicted flight plan, predicted maximum aircraft altitude, predicted ascent time, predicted descent time, a temperature indicative of destination temperature (such as an air temperature at the predicted landing time), a temperature indicative of the local temperature (such as a local air temperature before take-off), predicted time before take-off, predicted distance of flight, predicted flight time, amount of fuel in said one or more fuel tanks before take-off, whether or not inerting gas was provided in the immediately-preceding flight, and predicted amount of fuel in said one or more fuel tanks (optionally on landing). Those skilled in the art will realise that this list is non-exhaustive.

As mentioned above, determining whether or not it is necessary to inert the fuel tank may comprise comparing said indicative temperature value with a predetermined temperature value. The method may comprise comparing said indicative temperature value with a predetermined temperature value, and considering one or more flight-related parameters. For example, if said indicative temperature value is relatively high (for example, the fuel temperature at fueling is lower than the predetermined value, but by an amount which would usually be indicative of the need for inerting), but the local air temperature is sufficiently low that one would expect the fuel to cool once in the fuel tank, then it may be determined that there is no requirement for inerting the fuel tank. Conversely, if the fuel temperature on fueling is low, but the local air temperature is relatively high and if take-off is not expected for a long period of time, then it may be determined that inerting of the one or more fuel tanks is necessary. Other flight-related parameters may be taken into account, such as heating due to solar radiation, heating of the fuel if the fuel is used to cool the hydraulic system or heating of the fuel when used as a heat sink for aircraft air conditioning.

Determining whether or not it is necessary to inert the one or more fuel tanks may optionally comprise sensing the oxygen content of the gas (if any), above the fuel in a fuel tank. If the gas above the fuel has a relatively low oxygen level, then it is less likely that inerting of the fuel tank will be required.

An initial determination as to whether or not it is necessary to inert the fuel tank is preferably performed before take-off, optionally before taxiing prior to take-off, optionally before moving after refueling (e.g. before power-back or push-back) and optionally before starting the aircraft's engines. This facilitates, in appropriate circumstances, the disablement of the aircraft fuel tank inerting system for the entire flight. Those skilled in the art will realise that it would be perfectly possible to restart the aircraft fuel tank inerting system before, during or after flight, if desired.

The method may comprise making a second determination (subsequent to the initial determination) as to whether or not it is necessary to inert the fuel tank. For example, a second determination may be made in flight. Alternatively or additionally, a second determination may be made if there is a substantive, (and optionally) unexpected change to any of the various parameters which may affect the fuel tank environment e.g. unexpected change in ambient temperature, change to flight plan and/or delay in taking off. This second determination may be based on one or more flight parameters.

The method may comprise providing a signal indicative of whether it is necessary or not to inert the fuel tank.

The method of the first aspect of the present invention may be used to determine whether or not it is necessary to inert more than one fuel tank.

In accordance with a second aspect of the present invention, there is provided a method of controlling the inerting of a refueled aircraft fuel tank, the method comprising providing a temperature value indicative of a temperature of the fuel after refueling, and based on said temperature value, determining whether or not it is necessary to inert the aircraft fuel tank, and based on said determination, controlling the provision of inerting gas to the aircraft fuel tank.

The method of the first aspect of the present invention described the provision of a temperature value indicative of a temperature of the fuel after refueling, and based on said temperature value, determining whether or not it is necessary to inert the aircraft fuel tank. The method of the second aspect of the present invention may therefore comprise any feature of the method of the first aspect of the present invention. For example, the provision of a temperature value indicative of a temperature of the fuel after refueling may be as described above in relation to the method of the first aspect of the present invention.

Controlling the provision of inerting gas to the aircraft fuel tank may take place prior to take-off and optionally before starting the engines.

Controlling the provision of inerting gas to the aircraft fuel tank may comprise controlling the provision of inerting gas to the aircraft fuel tank for substantially all of the immediately forthcoming (i.e. the next) flight.

If it is determined that it is necessary to provide inerting gas, then inerting gas may optionally be provided during one or more of take-off, ascent and cruise, optionally during one or more of take-off, ascent and the first 50% of the cruise phase, and optionally during take-off, ascent and further optionally during the first 50% of the cruise phase.

The aircraft may comprise an aircraft fuel tank inerting arrangement for supplying inerting gas to the aircraft fuel tanks. Such fuel tank inerting arrangements are typically based on one of two technologies; air separation modules (which typically operate using hollow fibres) and catalytic inerters (which typically reacts ullage gas with oxygen in the presence of the catalyst to remove the oxygen from the air and feed the inert reaction products to the fuel tank), both of which are described at http://blog.parker.com/catalytic-inerting-technology%3A-next-generation-fuel-tank-inerting-solution. Such fuel tank inerting arrangements typically comprise an inlet for the introduction of air (typically, in use, coupled to a source of air, such as an engine bleed line or a blower), optionally an ozone remover for removing ozone from the air, a means for reducing the oxygen content in the air (such as an air separation module or a catalyst used to catalyse a reaction between oxygen and ullage gas), a cooler for reducing the temperature of a gas (typically for reducing the temperature of the air introduced to the means for reducing the oxygen content in air, such as a heat exchangers, or for reducing the temperature of any gas to be supplied to the fuel tank) and an outlet for delivering oxygen-depleted air (also known as nitrogen-enhanced air) to the fuel tank.

Controlling the provision of inerting gas to the aircraft fuel tank may comprise disabling the aircraft fuel tank inerting arrangement. Disabling the aircraft fuel tank inerting arrangement may allow a significant amount of fuel to be saved and may help extend the life of one or more components of the aircraft fuel tank inerting arrangement (an ASM or a catalyst would, for example, typically need replacing after a certain amount of use). Disabling of the aircraft fuel tank inerting arrangement means that the fuel tank inerting arrangement is not able to operate until it is re-enabled. Disabling the aircraft fuel tank inerting arrangement may take place prior to take-off, optionally prior to taxiing and, optionally, prior to starting the aircraft's engine(s). Disabling the aircraft fuel tank inerting arrangement may optionally comprise removing one or more parts thereof, for example, the air separation module or the catalyst. This may be beneficial because this would reduce the weight of the aircraft. For example, if the projected flight plans for an aircraft are to operate in a cold climate for a prolonged period of time, then it may be beneficial to remove one or more part of the aircraft fuel tank inerting arrangement. Disabling the aircraft fuel tank inerting system may optionally comprise operating one or more valves so as to inhibit passage of inerting gas into the fuel tank, optionally inhibiting passage of gas into and through any air separation module or catalyst (thereby increasing the lifespan of the air separation module or catalyst).

Disabling the aircraft fuel tank inerting arrangement may be performed manually, for example, by a member of flight crew, optionally in reply to an indication (for example, visual or aural) that it is permissible to disable the aircraft fuel tank inerting arrangement. Alternatively or additionally, disabling the aircraft fuel tank inerting arrangement may be performed automatically (i.e. without human intervention). In this case, for example, a signal indicative of the temperature of the fuel when it was delivered to the fuel tank may be delivered to the aircraft fuel tank inerting arrangement, said signal being consistent with there being no need to operate the fuel tank inerting arrangement on the forthcoming flight.

The aircraft fuel tank inerting arrangement may be disabled for substantially all of the forthcoming (i.e. next) flight.

For the avoidance of doubt, controlling the provision of inerting gas to the aircraft fuel tank may comprise providing inerting gas to the aircraft fuel tank.

The method of the second aspect of the present invention may comprise making a second determination (subsequent to an initial determination) as to whether or not it is necessary to inert the fuel tank, and based on the second determination, controlling the provision of inerting gas to the fuel tank. As described above in relation to the method of the first aspect of the present invention, it may be desirable to make a second determination as to whether or not it is necessary to inert the fuel tank, for example, if any flight-related parameters have changed which may affect the flammability of the fuel.

The method of the second aspect of the present invention may be used to control the provision of inerting gas to more than one aircraft fuel tank.

In accordance with a third aspect of the present invention, there is provided an aircraft fuel tank inerting control system comprising:

an aircraft fuel tank inerting arrangement for delivering inerting gas to an aircraft fuel tank;
a temperature input module for acquiring a temperature indicative of the temperature of fuel after refueling; and
a control module for controlling the operation of the aircraft fuel tank inerting arrangement and being configured to receive an output from the temperature input module dependent on the temperature of fuel after refueling and to control operation of the aircraft fuel tank inerting arrangement in dependence on the output of the temperature input module.

Those skilled in the art will realise that neither the fuel tank nor the fuel are features of the aircraft fuel tank inerting control system of the third aspect of the present invention.

The aircraft fuel tank inerting control system may be configured to perform the methods of the first and/or second aspects of the present invention.

The aircraft fuel tank inerting control system may comprise a temperature sensor coupled to the temperature input module for providing a temperature indicative of the temperature of fuel after refueling. The sensor may be located in the fuel tank or in a fuel conduit through which fuel may be delivered to the fuel tank.

The aircraft fuel tank inerting control system may comprise a flight-related parameters input module. The control module may be configured to receive an output from the flight-related parameters input module, and may be configured to control operation of the aircraft fuel tank inerting arrangement in dependence on the output of the flight-related parameters input module. Such flight-related parameters are discussed above in relation to the method of the first aspect of the present invention.

The aircraft fuel tank inerting arrangement may optionally comprise a source of inerting gas. The source of inerting gas may, for example, comprise an inlet and an oxygen reducer (such as an air separation module or catalyst) capable of reducing the oxygen content in gas delivered through the inlet. Alternatively, the source of inerting gas may comprise a source of inert gas having an oxygen content lower than air (21%). For example, the source of inerting gas may comprise a source of nitrogen. The aircraft fuel tank inerting arrangement may comprise a particulate filter. The aircraft fuel tank inerting arrangement may comprise an ozone remover, optionally located upstream of a means for reducing the oxygen content in a gas. The aircraft fuel tank inerting arrangement may comprise a cooler, optionally arranged upstream of the means for reducing the oxygen content in a gas. The cooler may comprise a heat exchanger, optionally provided with a bypass. The aircraft fuel tank inerting arrangement may comprise an outlet for delivering inerting gas to the fuel tank. The aircraft fuel tank inerting arrangement may comprise one or more valves for controlling the flow of gas through the aircraft fuel tank inerting arrangement.

As mentioned above, the control module is configured to control operation of the aircraft fuel tank inerting arrangement in dependence on the output of the temperature input module. In this connection, for example, the control module may be configured to control operation of one or more valves for controlling the flow of gas through the aircraft fuel tank inerting arrangement.

In accordance with a fourth aspect of the present invention, there is provided a method of determining whether it is necessary to inert an aircraft fuel tank of an aircraft having an intended departure date from a departure location, the method comprising providing a temperature value indicative of the highest temperature at the departure location on the intended departure date, and based on said temperature value, determining whether or not it is necessary to inert the aircraft fuel tank.

The applicant has discovered that the temperature at a subsequent departure location determines whether it is necessary to inert an aircraft fuel tank. However, while it is a good assumption that an aircraft will depart a destination a day or so after arriving, it is generally not known at what time of day the aircraft will depart. Therefore, in order to determine whether or not it is necessary to inert a fuel tank the applicant has determined that one should use the highest temperature. The highest temperature at the departure location is preferably an ambient air temperature.

The intended departure location will typically be provided as a GPS coordinate or as an airport code (e.g. an IATA code).

The intended departure date may be the same date as that on which it is determined whether or not it is necessary to inert the aircraft fuel tank. The intended departure date may be one or more days after the date on which it is determined whether or not it is necessary to inert the aircraft fuel tank.

The departure location may be a local location i.e. place where the aircraft is located at the time of making the determination. Said temperature value may therefore be provided when the aircraft is located as said departure location.

The departure location may be an intended destination of the aircraft i.e. somewhere the aircraft is intended to be going and from where the aircraft will next depart. Therefore, the temperature value may be indicative of the highest temperature at the destination. Said temperature value may therefore be provided when the aircraft is not at said departure location, but is intending to go to said departure location. Said temperature value may therefore be provided when the aircraft is in flight. Said temperature value may be provided prior to the aircraft taking-off for said destination. Therefore, if it is known that it will likely be cold when the aircraft is next due to take-off (e.g. the destination has a cold climate), then it may be determined that it is not necessary to inert the aircraft fuel tank. Conversely, if it is known that it will probably be hot when the aircraft is next due to take-off (e.g. in the afternoon in certain desert locations), then it may be determined that it will be necessary to inert the aircraft fuel tank.

The temperature value may be a predicted value, for example, a value provided by a weather forecast for the departure location. The temperature may be the highest temperature predicted in the weather forecast for the departure location on the intended departure date.

The temperature value may be based on statistical data, for example, based on the date and intended time of departure of the aircraft. The statistical data may be historical statistical data.

The highest temperature should reflect the highest temperature on the date on which the aircraft is likely to be leaving the departure location. Since the highest temperature at a departure location will not differ substantially over a period of several days, the highest temperature may be determined based on the date of determination of whether or not it is necessary to inert the fuel tank, or up to 15 days either side of that date of determination.

Those skilled in the art will realise that the highest temperature need not to reflect the highest temperature recorded at or around a particular date. In this way, the highest temperature may effectively ignore or discard statistical outliers. The temperature is therefore a highest likely temperature.

The highest temperature may be a mean, median or modal temperature. For example, the highest temperature may be a mean, median or modal maximum daily temperature, having regard to the likely date of departure from the departure location. For example, the highest temperature may be the mean maximum daily temperature, having regard to the likely date of departure from the departure location.

The highest temperature may therefore be based on a centile, for example. The centile may optionally be at least the $70^{th}$ centile, optionally at least the $80^{th}$ centile and optionally at least the $90^{th}$ centile. The centile may optionally be no more than the $98^{th}$ centile, optionally no more than the $95^{th}$ centile, optionally no more than the $90^{th}$ centile and optionally no more than the $80^{th}$ centile.

As in the method of the first aspect of the present invention, determining whether or not it is necessary to inert the fuel tank may comprise comparing said temperature value with a predetermined temperature value. This comparing said temperature value with a predetermined value may comprise those features described above in relation to the first aspect of the present invention.

As in the method of the first aspect of the present invention, determining whether or not it is necessary to inert the fuel tank may optionally comprise considering one or more flight-related parameters, such as, predicted flight plan, predicted maximum aircraft altitude, predicted ascent time, predicted descent time, a temperature indicative of destination temperature (such as an air temperature at the predicted landing time), a temperature indicative of the local temperature (such as a local air temperature before take-off), predicted time before take-off, predicted distance of flight, predicted flight time, amount of fuel in said one or more fuel tanks before take-off, whether or not inerting gas was provided in the immediately-preceding flight, and predicted amount of fuel in said one or more fuel tanks (optionally on landing). Considering one or more flight-related parameters may comprise those features described above in relation to the first aspect of the present invention.

As with the method of the first aspect of the present invention, the method may comprise making a second determination (subsequent to an initial determination) as to whether or not it is necessary to inert the fuel tank. For example, a second determination may be made if the intended departure date changes, or if the departure location changes (for example, if the destination of the aircraft changes).

As with the first aspect of the present invention, the method of the fourth aspect of the present invention may be used to determine if it is necessary to inert more than one fuel tank.

For the avoidance of doubt, the method of the fourth aspect of the present invention may comprise one or more features of the method of the first aspect of the present invention (and vice versa), so long as said features are not incompatible with the respective method.

In accordance with a fifth aspect of the present invention, there is provided a method of controlling the inerting of an aircraft fuel tank of an aircraft having an intended departure location and an intended departure date, the method comprising providing a temperature value indicative of the highest temperature at the departure location on the intended departure date, and based on said temperature value, determining whether or not it is necessary to inert the aircraft fuel tank, and based on said determination, controlling the provision of inerting gas to the aircraft fuel tank.

The method of the fifth aspect of the present invention may comprise any of those features described above in relation to the fourth aspect of the present invention.

Optionally, if it is determined that inerting gas should be provided, then inerting gas may be provided to the aircraft fuel tank during one or more of the following phases of a flight: cruise, descent, approach, landing, taxiing and at stand, optionally during one or more of the last 50% of cruise (optionally the last hour of cruise), approach, landing, taxiing and at stand. Inerting gas may be provided during the last 50% or last hour of cruise, during descent and approach.

An aircraft fuel tank inerting arrangement may be provided. The aircraft fuel tank inerting arrangement may comprise one or more features of the aircraft fuel tank inerting arrangement as described above in relation to the second aspect of the present invention. Furthermore, controlling the provision of inerting gas to the aircraft fuel tank using the aircraft fuel tank inerting arrangement may be performed as described above in relation to the second aspect of the present invention.

The departure location may be the aircraft's destination, and if it is determined that the provision of inerting gas is required based on the highest temperature at the aircraft's intended departure location on the intended departure date, then the method may comprise providing inerting gas to the fuel tank in at least one of the cruising phase, descent phase and taxiing phase of the aircraft's flight or movements. This provides inerting gas to the fuel tank so that the fuel tank is inerted ready for the next flight, based on the highest temperature at departure.

In accordance with a sixth aspect of the present invention, there is provided an aircraft fuel tank inerting control system comprising:
- an aircraft fuel tank inerting arrangement for delivering inerting gas to an aircraft fuel tank;
- a temperature input module for acquiring a temperature indicative of the highest temperature at the aircraft's intended departure location on the intended departure date; and
- a control module for controlling the operation of the aircraft fuel tank inerting arrangement and being configured to receive an output from the temperature input module dependent on the temperature indicative of the highest temperature at the aircraft's intended departure location on the intended departure date and to control operation of the aircraft fuel tank inerting arrangement in dependence on the output of the temperature input module.

The aircraft fuel tank inerting arrangement of the sixth aspect of the present invention may comprise those features of the aircraft fuel tank inerting arrangement of the third aspect of the present invention.

Those skilled in the art will realise that neither the fuel tank nor the fuel are features of the aircraft fuel tank inerting control system of the sixth aspect of the present invention.

The aircraft fuel tank inerting control system may be configured to perform the methods of the fourth and/or fifth aspects of the present invention.

The temperature input module may be configured to receive said temperature indicative of the highest temperature at the aircraft's intended departure location on the intended departure date from a remote source. Alternatively or additionally, the temperature input module may be configured to interrogate a database of temperatures to provide a temperature indicative of the highest temperature at the aircraft's intended departure location on the intended departure date.

The aircraft fuel tank inerting control system may comprise a flight-related parameters input module. The control module may be configured to receive an output from the flight-related parameters input module, and may be configured to control operation of the aircraft fuel tank inerting arrangement in dependence on the output of the flight-related parameters input module. Such flight-related parameters are discussed above in relation to the method of the first aspect of the present invention.

The aircraft fuel tank inerting arrangement may optionally comprise a source of inerting gas. The source of inerting gas may, for example, comprise an inlet and an oxygen reducer (such as an air separation module or catalyst) capable of reducing the oxygen content in gas delivered through the inlet. Alternatively, the source of inerting gas may comprise a source of inert gas having an oxygen content lower than air (21%). For example, the source of inerting gas may comprise a source of nitrogen. The aircraft fuel tank inerting arrangement may comprise a particulate filter. The aircraft fuel tank inerting arrangement may comprise an ozone remover, optionally located upstream of a means for reducing the oxygen content in a gas. The aircraft fuel tank inerting arrangement may comprise a cooler, optionally arranged upstream of the means for reducing the oxygen content in a gas. The cooler may comprise a heat exchanger, optionally provided with a bypass. The aircraft fuel tank inerting arrangement may comprise an outlet for delivering inerting gas to the fuel tank. The aircraft fuel tank inerting arrangement may comprise one or more valves for controlling the flow of gas through the aircraft fuel tank inerting arrangement.

As mentioned above, the control module is configured to control operation of the aircraft fuel tank inerting arrangement in dependence on the output of the temperature input module. In this connection, for example, the control module may be configured to control operation of one or more valves for controlling the flow of gas through the aircraft fuel tank inerting arrangement.

In accordance with a seventh aspect of the present invention, there is provided a method of determining whether or not to remove one or more parts of an aircraft fuel tank inerting arrangement, the aircraft fuel tank inerting arrangement being configured to provide inerting gas to an aircraft fuel tank,
- the method comprising estimating the whereabouts of the aircraft over a period of at least 4 weeks;
- providing a temperature reflective of the aircraft's estimated whereabouts over said period;
- and based on said temperature, determining whether or not it is necessary to provide inerting gas to the fuel tank, and based on said determination, deciding whether or not to remove one or more parts of the aircraft fuel tank inerting arrangement.

Those skilled in the art will realise that the aircraft fuel tank and aircraft fuel tank inerting arrangement are not part of the method of the seventh aspect of the present invention.

Short haul aircraft in particular will often fly in a geographically-limited region. For example, a short haul aircraft may solely fly in Northern Europe. The applicant has discovered that if an aircraft is limited to a certain geographical area for a prolonged amount of time (for example, say 4 weeks), and the temperature is likely to be sufficiently cold over the period of time, then it may be possible to remove one or more components of an aircraft fuel tank inerting arrangement. For example, if it will not be necessary to inert the aircraft over said period, it may be possible to remove one or more aircraft components. Some of those components are relatively heavy and therefore removal of un-necessary components may be beneficial in reducing fuel use.

The temperature is optionally an air temperature.

The temperature may be a mean, modal or median predicted temperature. The temperature may be a mean, modal or median predicted maximum temperature. The temperature may be a centile temperature, for example, a centile of daily maximum temperatures, for example, at least a $75^{th}$ centile of daily maximum temperatures.

The period may be at least 6 weeks, optionally at least 8 weeks and optionally at least 12 weeks.

The method of the seventh aspect of the present invention may comprise those features described above with reference to the first and fourth aspects of the present invention, in so far as those features are not incompatible with the method of the seventh aspect of the present invention.

In accordance with an eighth aspect of the present invention, there is provided a method of adapting an aircraft comprising determining, in accordance with the method of the seventh aspect of the present invention, whether or not to remove one or more parts of an aircraft fuel tank inerting arrangement, and if said determination is that one or more parts of an aircraft fuel tank inerting arrangement could be removed, then removing one or more parts of an aircraft fuel tank inerting arrangement.

Such fuel tank inerting arrangements typically comprise an inlet for the introduction of air or other inlet gas (typically, in use, coupled to a source of air, such as an engine bleed line), optionally an ozone remover for removing ozone from the air, a means for reducing the oxygen content in the air (such as an air separation module or a catalyst for catalysing a reaction between oxygen and ullage gas), a cooler for reducing the temperature of a gas (typically for reducing the temperature of the air introduced to the means for reducing the oxygen content in air, such as a heat exchangers, or for reducing the temperature of any gas to be supplied to the fuel tank) and an outlet for delivering oxygen-depleted air (also known as nitrogen-enhanced air) to the fuel tank. The method of the eighth aspect of the present invention may comprise removing one or more of the features mentioned above. In particular, the method may comprise removing the means for reducing oxygen content in the air (for example, the air separation module or catalyst).

The method of the eighth aspect of the invention may comprise features described above in relation to the second and fifth aspects of the present invention, in so far as those features are not incompatible with the method of the eighth aspect of the present invention.

In accordance with a ninth aspect of the present invention there is provided an operational aircraft comprising an aircraft fuel tank inerting arrangement from which one or more components is absent such that the aircraft fuel tank inerting arrangement is unable to provide inerting gas to an aircraft fuel tank. Said one or more absent components may be selected from those listed above in relation to the eighth aspect of the present invention. "Operational" indicates that the aircraft is not being serviced or repaired. The aircraft is optionally moving.

In accordance with a tenth aspect of the present invention, there is provided an aircraft comprising a fuel tank and an aircraft fuel tank inerting control system in accordance with the third and/or sixth aspects of the present invention, the aircraft fuel tank inerting control system being configured to control the delivery of inerting gas to the fuel tank.

Those skilled in the art will realise that the aircraft of the tenth aspect of the present invention may comprise a plurality of fuel tanks, in which case, the aircraft fuel tank inerting system may be configured to control the delivery of inerting gas to more than one and, optionally, the plurality of fuel tanks.

In accordance with an eleventh aspect of the present invention, there is provided a software product comprising a series of instructions arranged, when executed on a computer, to perform one or more of the steps of the method of the first, second, fourth or fifth aspects of the present invention, for example, to perform that or those steps that comprise comparing the temperature value indicative of the temperature of the fuel after refueling with a predetermined temperature which is indicative of a requirement to provide inerting gas to the aircraft fuel tank.

The present invention is of particular benefit to commercial transport aircraft. The aircraft is preferably of a size equivalent to an aircraft designed to carry more than 75 passengers, and more preferably more than 100 passengers.

It will of, course, be appreciated that features described in relation to one aspect of the present invention may be incorporated into other aspects of the present invention. For example, the methods of the first and second aspects of the present invention may incorporate any of the features described with reference to the system of the third aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
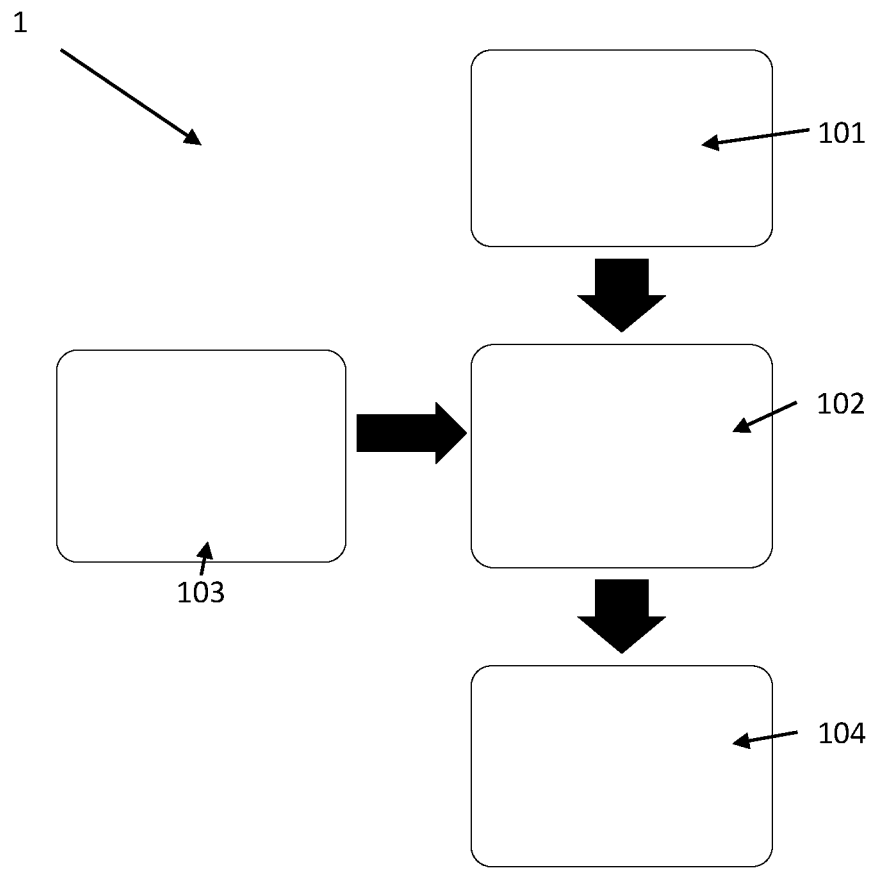
FIG. 1a shows a schematic view of a method of controlling the inerting of an aircraft fuel tank according to a first embodiment of the invention.
Figure 1B:
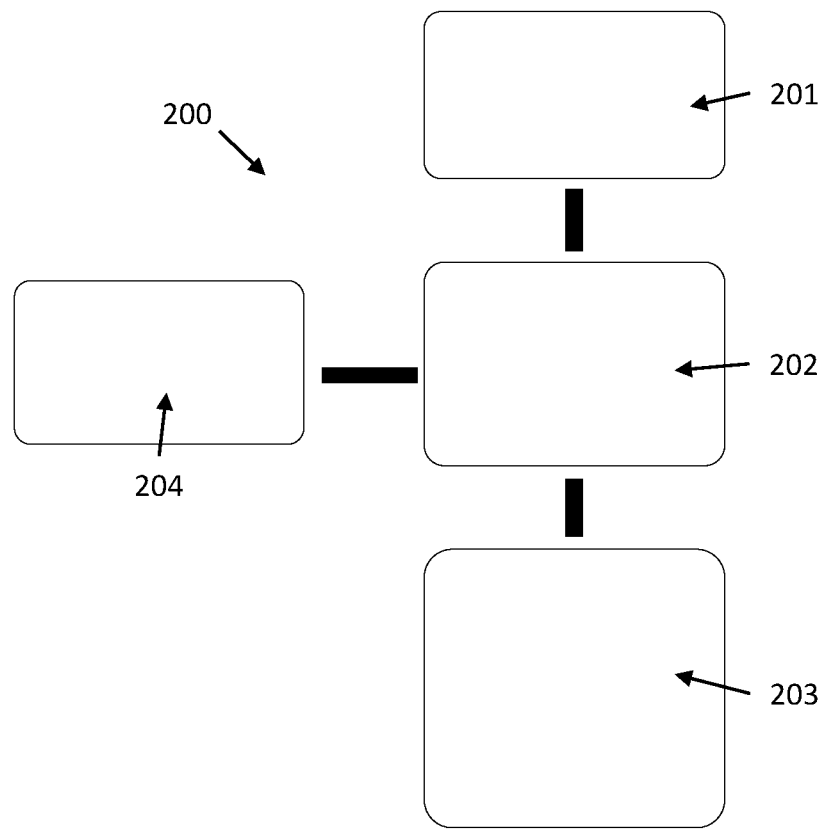
FIG. 1b shows a schematic view of an aircraft fuel tank inerting control system according to an embodiment of the invention.
Figure 2:
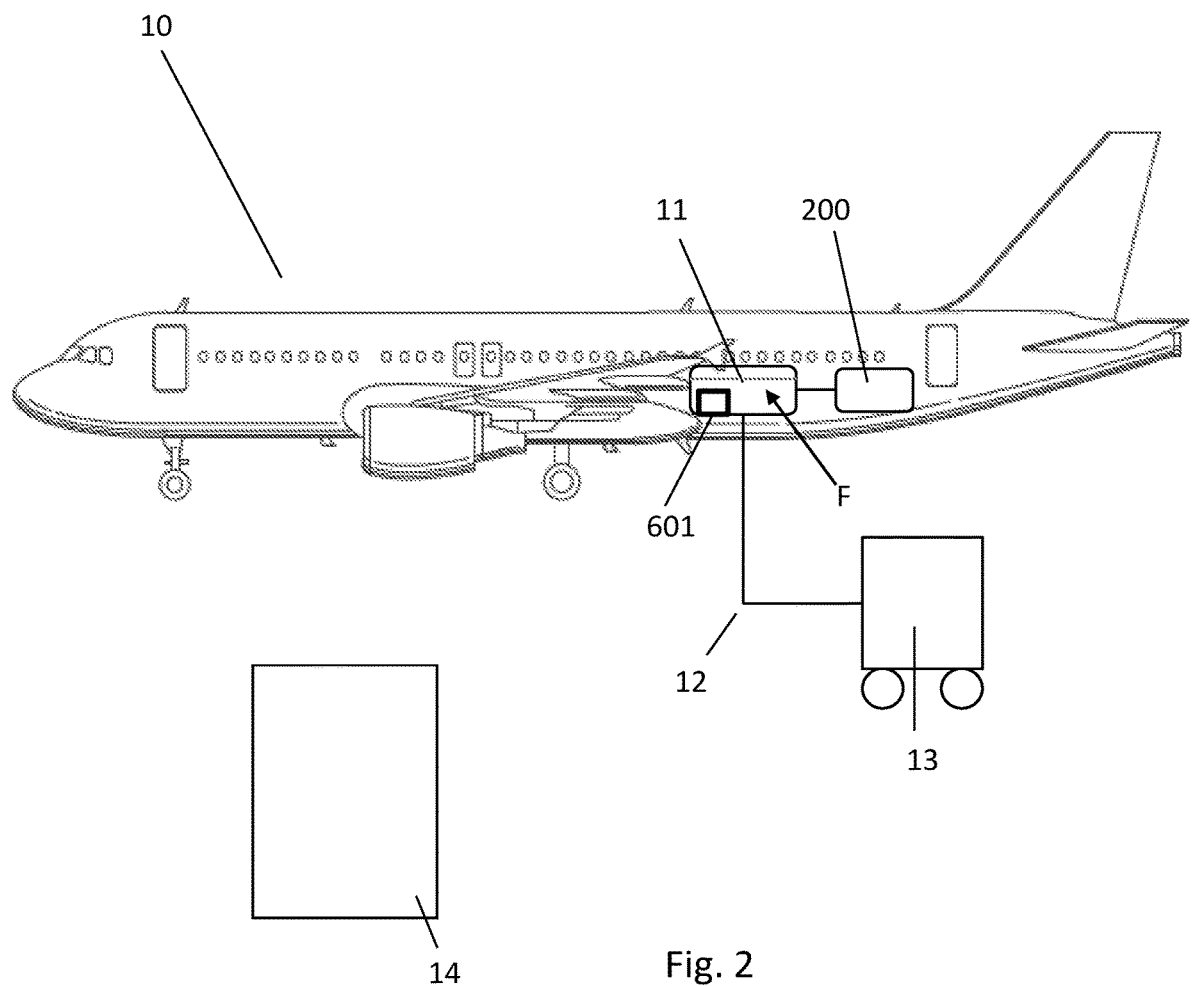
FIG. 2 shows a schematic view of an aircraft according to an embodiment of the invention.

An exemplary method 1 of controlling the inerting of an aircraft fuel tank in accordance with an embodiment of the present invention will now be described by way of example only with reference to FIGS. 1a, 1b and 2. FIG. 2 shows an aircraft 10 comprising a fuel tank 11 being fueled by a fuel bowser 13 via a fueling line 12. Fuel has been previously provided to the bowser 13 from fuel storage tank 14. The applicant has discovered that it may be beneficial to control the inerting of the fuel tank 11 based on the temperature of the fuel F after refueling. The method 1 of controlling the inerting of the aircraft fuel tank 11 comprises providing 101 a temperature value indicative of a temperature of the fuel F after refueling, and based on said temperature value, determining 102 whether or not it is necessary to inert the aircraft fuel tank 11, and based on said determination, controlling 104 the provision of inerting gas to the aircraft fuel tank 11. The temperature value which is indicative of a temperature of the fuel F after refueling is provided by a temperature sensor 601 located in the fuel tank 11. This method 1 is performed while the aircraft 10 is on the ground, after refueling of the aircraft 10.

The measurement of the temperature and control of inerting gas is provided by the aircraft fuel tank inerting control system 200 which comprises an aircraft fuel tank inerting arrangement 203 for delivering inerting gas to the aircraft fuel tank 11, a temperature input module 201 for acquiring a temperature indicative of the temperature of fuel F after refueling; and a control module 202 for controlling the operation of the aircraft fuel tank inerting arrangement 203. The control module 202 is also configured to receive an output from the temperature input module 201 dependent on the temperature of fuel F after refueling and to control operation of the aircraft fuel tank inerting arrangement 203 in dependence on the output of the temperature input module. In the present case, the operation of the aircraft fuel tank inerting arrangement 203 is also controlled based on flight-related parameters provided 103 by flight-related parameter module 204.

Many possible methods may be used to determine if it is necessary to provide inerting gas to the fuel tank 11. Typically, the temperature of the fuel in the fuel tank is compared to a pre-determined temperature, for example, the lower flammability limit of the fuel F. If the temperature of the fuel is lower than the lower flammability limit of the fuel F by at least 20° C., then this is indicative of there being no necessity to provide inerting gas to the fuel tank 11. In deciding whether or not it is necessary to provide inerting gas to the fuel tank 11, in the present example, various flight related parameters are taken into consideration. For example, expected take-off time is used to calculate a period of time for which the aircraft will be subjected to ambient ground conditions. The ambient temperature and time on the ground are used, in conjunction with the temperature of the fuel as measured after refueling, to estimate the temperature of the fuel at take-off, and therefore whether or not it will be necessary to provide inerting gas to the fuel tank 11. In the present case, if it is determined that it will not be necessary to provide inerting gas to the fuel tank during the flight, then control module 202 cuts-off power to the aircraft fuel tank inerting arrangement 203, thereby disabling the aircraft fuel tank inerting arrangement 203. This can be done, for example, by removing electrical power from one or more of the components of the fuel tank inerting arrangement 203. Alternatively, the aircraft fuel tank inerting arrangement 203 may effectively be disabled by preventing flow of gas into and/or out of the aircraft fuel tank inerting arrangement.

Figure 4:
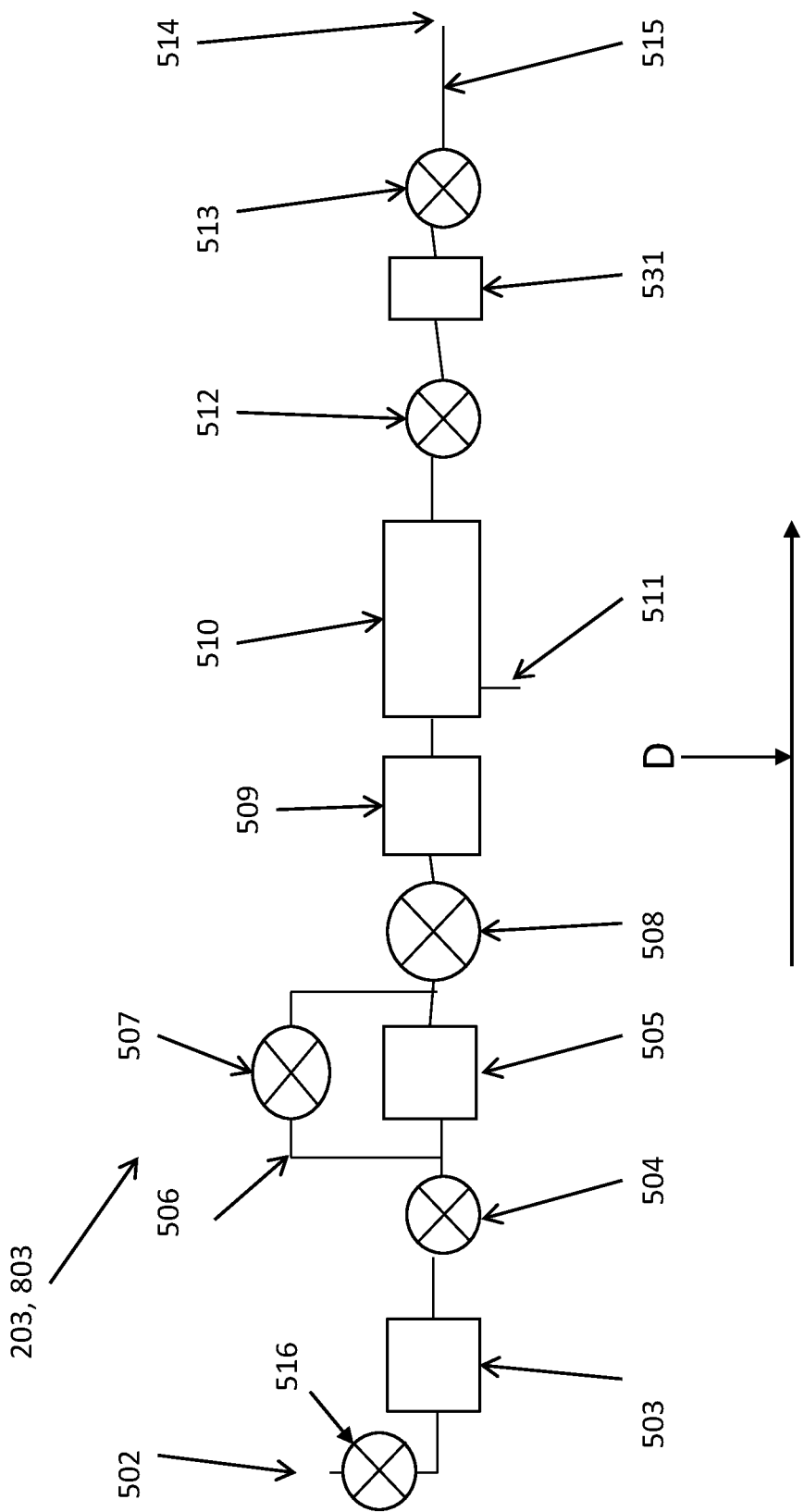
FIG. 4 shows a schematic view of an aircraft fuel tank inerting arrangement for use in the aircraft fuel tank inerting control system of FIG. 1b.

This will now be discussed by way of example only by reference to FIG. 4. The aircraft fuel tank inerting arrangement is shown generally by reference numeral 203. The direction of airflow is generally denoted by arrow D, with inlet 502 being upstream, and outlet 514 being downstream. The aircraft fuel tank inerting arrangement 203 comprises an inlet 502 arranged to receive air from an aircraft engine bleed line (not shown). The air received from the engine bleed line is typically at a temperature of about 350° C. The air passes downstream through a valve 516 and then through an ozone remover 503 which removes ozone from the air. Ozone can cause problems to other components in the aircraft fuel tank inerting arrangement 203, in particular an air separation module 510 which is discussed in more detail in GB2520728 Immediately downstream of the ozone remover 503 is a shut-off valve 504 which is closable to prevent gas moving upstream or downstream of the shut-off valve. The shut-off valve 504 is typically used as a safety valve. Downstream of the shut-off valve 504 is a heat exchanger 505 which cools the gas passing there through, typically from 350° C. to between 50° C. and 100° C. A bypass line 506 is provided which allows a certain proportion of uncooled gas to bypass the heat exchanger 505 and to be mixed with gas treated by the heat exchanger 505. A valve 507 is provided in the bypass line 506 to control the amount of gas that passes through the bypass line 506. The bypass line 506 facilitates the control of the temperature of the gas. A further shut-off valve 508 is provided downstream of the junction where the gases from the bypass line 506 and heat exchanger 505 are mixed. The cooled gas is filtered by an ULPA (ultra low particulate air) filter 509 to remove particulate and then passed to an air separation module 510. The air separation module 510 removes at least some of the oxygen from the gas, with oxygen-depleted air being fed via a flow control valve 512 to an outlet 514 for delivering oxygen-depleted air to a central fuel tank (not shown). The air separation module 510 typically comprises a multiplicity of aligned permeable fibres. The lateral walls of the fibres have a greater permeability to oxygen than nitrogen, and therefore oxygen permeates laterally through the fibres more than nitrogen, thereby reducing the amount of oxygen in the gas stream. The air separation module also comprises an outlet 511 for the egress therefrom of oxygen-enriched air. Such air is usually dumped overboard the aircraft.

The flow control valve 512 is a globe valve and is operable to finely control the amount of oxygen-depleted gas flowing to the outlet 514. The globe valve comprises a plug or disk (not shown) which is movable towards and away from a valve seat (not shown), thereby varying the flow of gas through the valve 512. The valve plug or disk is associated with an actuator (not shown) in the form of a piston that may be used to move the stem (not shown) of the globe valve, and thereby move the plug or disk of the valve towards or away from the valve seat, thereby changing the rate of flow of gas.

A one-way valve 513 is provided downstream of the flow control valve 512. The one-way valve 513 inhibits passage of gas upstream. This is advantageous because it inhibits passage of fuel-bearing gas from the fuel tank to upstream components, such as the heat exchanger 505 which can be hot.

The aircraft fuel tank inerting arrangement 203 is further provided with a flow sensor 531 immediately downstream of the flow control valve 512. The flow sensor 531 determines the gas flow rate immediately downstream of the flow control valve 512. The flow rate determined by the flow sensor 531 is compared with a desired value or range of values which may be determined, for example, by the amount of fuel left in the fuel tank and/or on the stage of the flight (e.g. descent, climb or level flight). The difference between the measured value and desired value may be used to control the actuator associated with the flow control valve 512. For example, if the flow rate is too high, the actuator may be used to close the valve, thereby reducing the flow rate. The use of such a flow control valve 512 enable the fine control of the amount of gas passing through the air separation module, thereby reducing the frequency with which it has to be replaced.

Control module 202 is arranged to control valve 516 which controls the supply of air into the aircraft fuel tank inerting arrangement 203. If it has been determined that it is not necessary to provide inerting gas to the fuel tank 11, then the control module 202 causes control valve 516 to be closed, thereby disabling the aircraft fuel tank inerting arrangement 203. It is expected that in most cases the fuel tank inerting system will be disabled for the whole of the forthcoming flight.

The example above discusses the use of ambient temperature and ambient ground time as flight-related parameters to help determine whether or not it is necessary to provide inerting gas to the fuel tank 11. EP3037353A1 discusses other flight-related parameters which may be used to determine if it is necessary to provide inerting gas to a fuel tank, particularly in paragraph [0011], and this teaching of EP3037353A1 is incorporated herein by reference.

Figure 3:
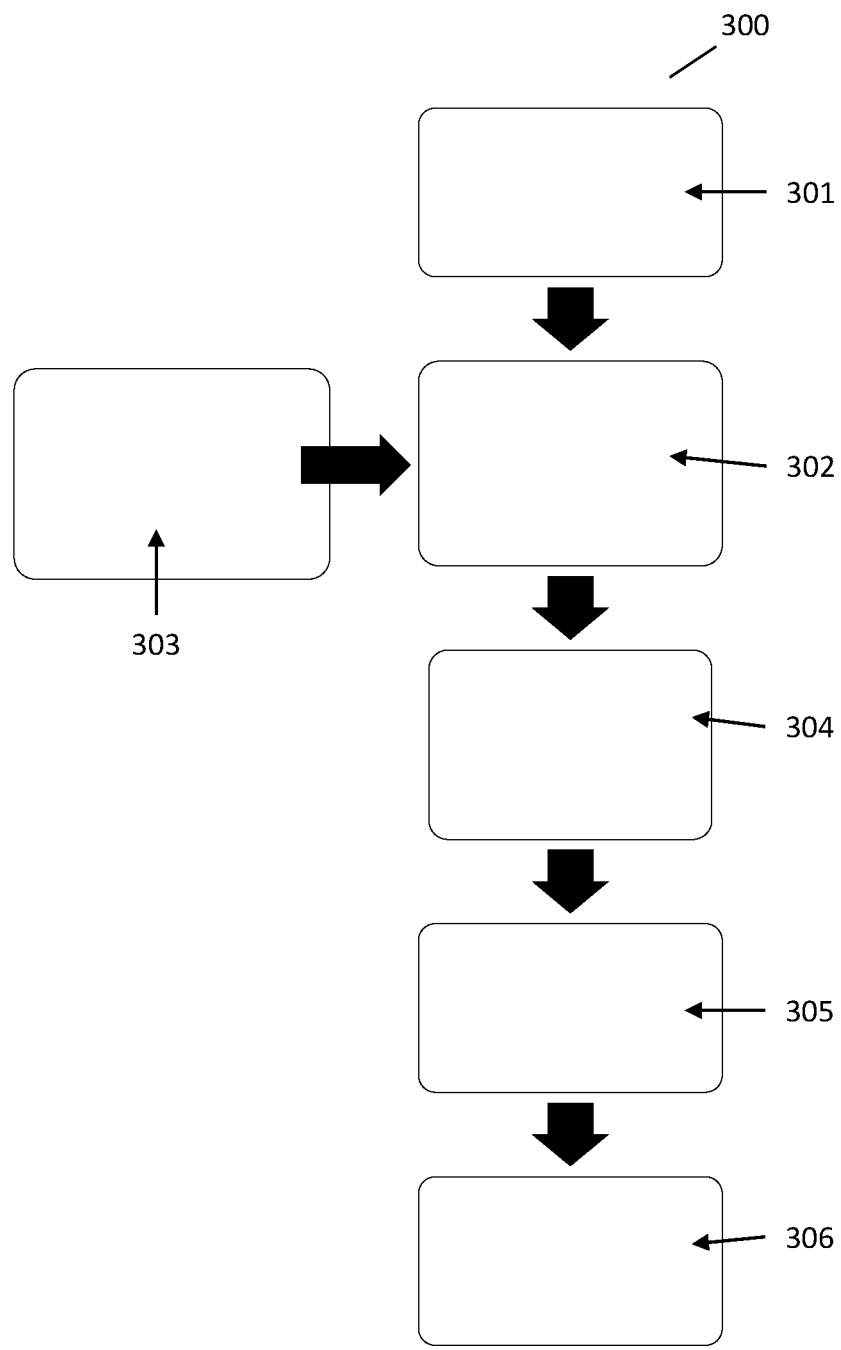
FIG. 3 shows a schematic view of a method of controlling the inerting of an aircraft fuel tank according to a first embodiment of the invention.

A further example of a method in accordance with an embodiment of the invention will now be described with reference to FIGS. 3 and 2. The method 300 of controlling the inerting of the fuel tank 11 comprises providing 301 a temperature indicative of the temperature of the fuel F in fuel tank 11 using sensor 601. Based on this temperature, and some provided 303 flight-related parameters (in this case, ambient temperature, expected time to be spent at ambient temperature, and the amount of fuel F in fuel tank 11), it is determined 302 whether or not it is necessary to provide inerting gas to fuel tank 11. In this case, it is determined that it is not necessary to provide inerting gas to fuel tank 11, and therefore control module 202 is used to control valve 516 to inhibit the flow of air through the aircraft fuel tank inerting arrangement 203, thereby effectively disabling it, and controlling 304 the provision of inerting gas. However, the flight is delayed, and the aircraft is therefore expected to be on the ground for a longer time than originally anticipated. In this case, a second determination 305 is made subsequent to the initial determination to determine whether or not it will be necessary to provide inerting gas to fuel tank 11. In this example, the second determination 305 is based on the extended ground time and the ambient temperature, the amount of fuel F in the fuel tank 11 and, of course, the temperature of the fuel F when delivered to the fuel tank 11. In this example, this second determination 305 determines that it is necessary to provide inerting gas to the fuel tank 11, and this provision of inerting gas is controlled 306 in accordance with this second determination 305, the control module 202 opens control valve 516 to permit passage of gas through the aircraft fuel tank inerting arrangement 203. In this case, the inerting gas is provided to the fuel tank 11 after the engines have been started because air is supplied from a bleed to the aircraft fuel tank inerting arrangement 203.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the embodiments above, the temperature indicative of the temperature of the fuel when delivered to the fuel tank is obtained from a sensor located in the fuel tank. Those skilled in the art will realise that other arrangements are possible. For example, a sensor could be located in a fueling conduit between a fueling bowser and the fuel tank. Alternatively or additionally, a sensor could be located in the fueling bowser or possibly in a static fuel storage facility (often known as a fuel dump). Such arrangements may be used, for example, if it is possible to take into account the effect which environmental conditions would have on the temperature of the fuel.

Those skilled in the art will realise that the oxygen content of the inerting gas may be tailored to suit the environmental conditions.

The embodiments above describe the use of an air separation module which reduces the oxygen content in air, thereby providing an inerting gas. Those skilled in the art will realise that other ways of providing inerting gas are possible. For example, a catalyst-based system may be used in which the catalyst catalyses the reaction of oxygen with ullage drawn from the fuel tank. Alternatively, for example, one or more cylinders of inert gas (such as nitrogen or a noble gas) may be provided.

The embodiments above describe how the aircraft fuel tank inerting arrangement may be disabled. Those skilled in the art will realise that the aircraft fuel tank inerting arrangement need not be disabled, but may be controlled in ways other than disablement, for example, by being enabled so that it is able to provide inerting gas when required.

Furthermore, the examples above describe how it is determined whether or not inerting gas will be needed at any time during the next flight. Those skilled in the art will realise that different determinations will be made. For example, it may be determined whether or not inerting gas will be needed for a first portion of a flight (for example, until approach and landing at the aircraft's destination).

The examples above demonstrate how the determination of whether or not inerting gas is required may be performed based on flight-based parameters provided by the aircraft flight management system. It is, of course, entirely possible for one or more of the flight-based parameters to be provided by a crew member (such as a pilot). Such flight-based parameters may, for example, include weather forecast information, such as the temperature at the aircraft's destination.

The examples above demonstrate how the determination of whether or not inerting gas is required are based on thermal properties, measurements and characteristics. It is, of course, entirely possible to use other parameters which affect the decision as to whether or not to inert a fuel tank. In this connection, another factor which may be used is the concentration of oxygen in the ullage or the previous flight inerting status. For example, if no inerting gas was provided in an immediately-preceding flight, then this may be indicative of a need to provide inerting gas.

The examples above illustrate how the temperature of the fuel is determined while the fuel is being delivered to the fuel tank. Those skilled in the art realise that the indicative temperature may be taken at some other time, for example, during taxiing or take-off, so long as the thermal history of the fuel is known so that the temperature of the fuel when it was delivered to the fuel tank can be estimated or calculated.

Figure 5A:
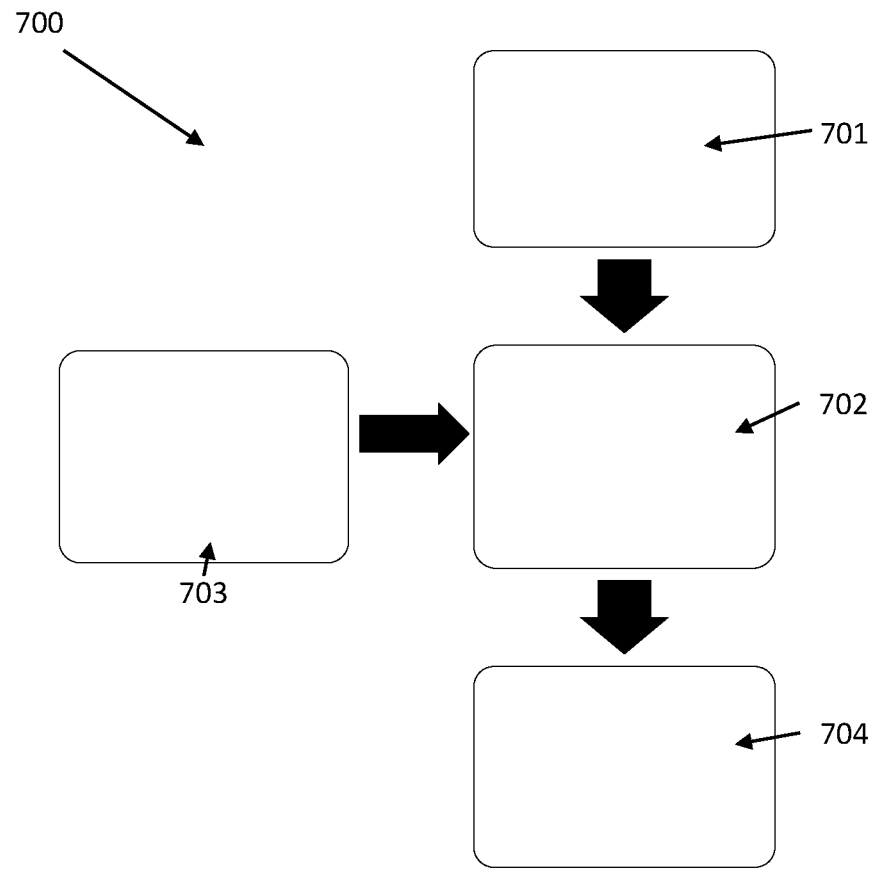
FIG. 5a shows a schematic view of a method of controlling the inerting of an aircraft fuel tank according to another embodiment of the invention.
Figure 5B:
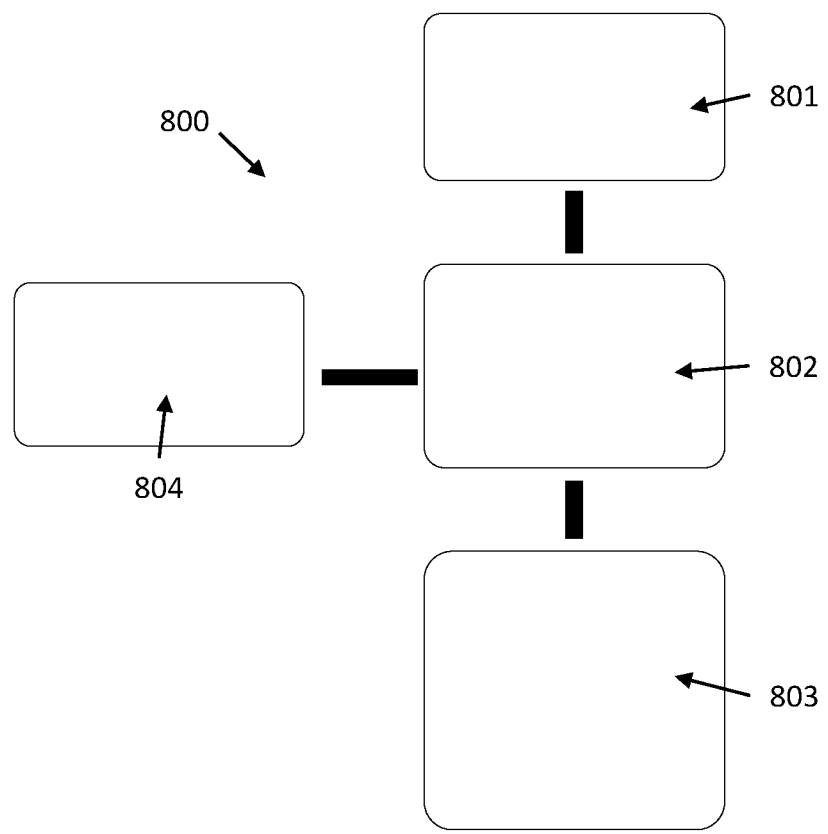
FIG. 5b shows a schematic view of an aircraft fuel tank inerting control system according to an embodiment of the invention.
Figure 6:
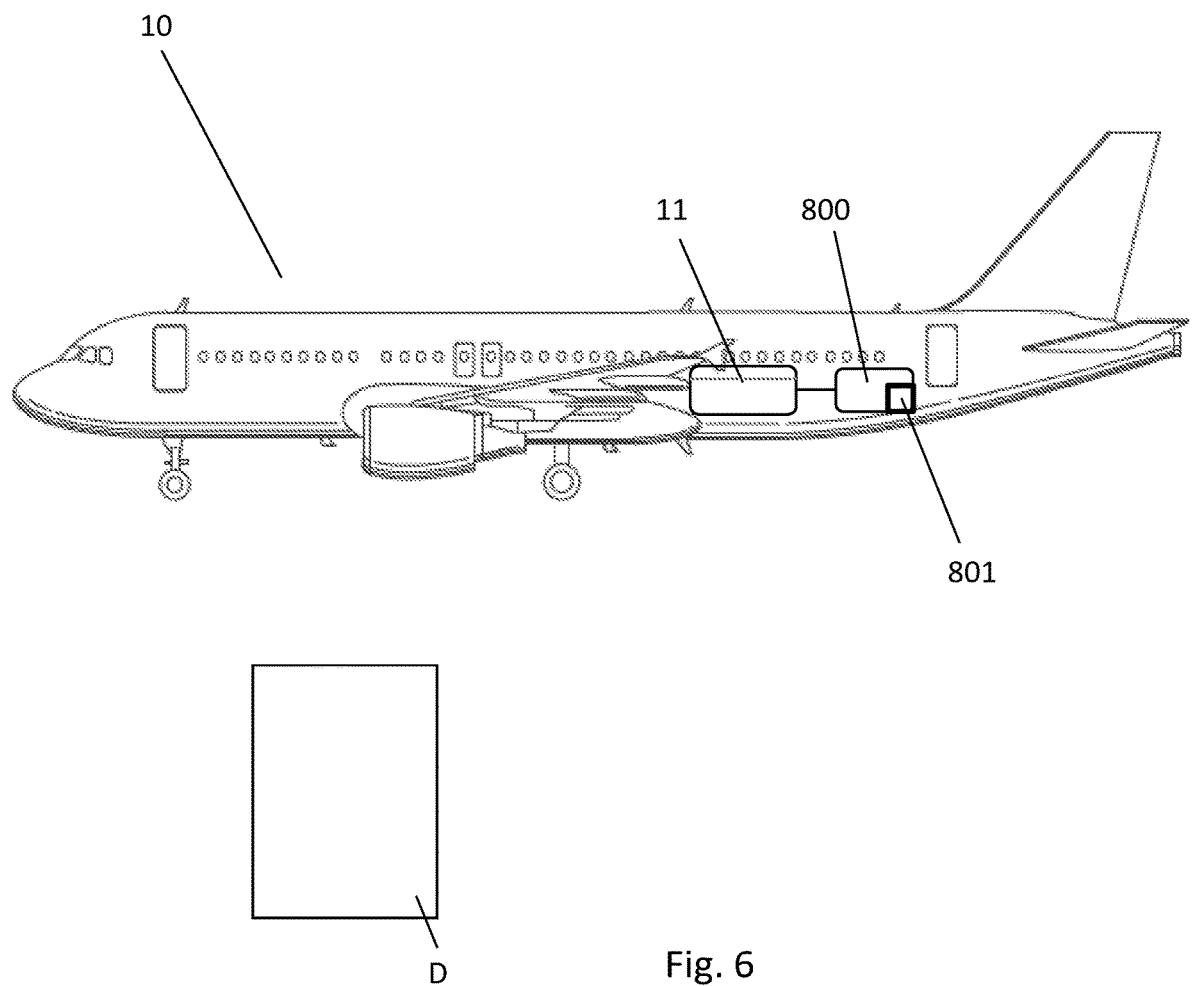
FIG. 6 shows a schematic view of an aircraft according to an embodiment of the invention.

An exemplary method 700 of controlling the inerting of an aircraft fuel tank in accordance with an embodiment of the fifth aspect of the present invention will now be described by way of example only with reference to FIGS. 5a, 5b and 6. FIG. 6 shows an aircraft 10 in flight, the aircraft 10 comprising a fuel tank 11. The aircraft 10 is heading for destination D. The method 700 of controlling the inerting of the aircraft fuel tank 11 comprises providing 701 a temperature value indicative of the highest temperature at destination D, and based on said temperature value, determining 702 whether or not it is necessary to inert the aircraft fuel tank 11, and based on said determination, controlling 704 the provision of inerting gas to the aircraft fuel tank 11. The temperature value which is indicative of a highest temperature at the destination is provided from a database held on the aircraft. The highest temperature at the destination will obviously have to have regard to the likely departure date from the destination. However, given that it is likely that the aircraft will depart from the destination location in the next few days (probably in the next day or two), the highest temperature may be determined based, for example, on the date of determining whether or not it is necessary to inert the fuel tank, the day after that, or possibly up to 15 days either side of that date. Optionally, the highest temperature may be transmitted from an airport (not shown) located at destination D, and transmitted to aircraft 10 via the temperature input module 801.

In this case, the highest temperature is a mean maximum daily temperature for the departure location, having regard to the likely departure date from the departure location. Alternatively, the highest temperature may be determined by reference to centiles for the maximum daily temperature for the departure location. For example, the highest temperature may be taken to be the $75^{th}$ centile of maximum daily temperature, having regard to the likely departure date from the departure location.

The acquisition of the temperature value and control of inerting gas is provided by the aircraft fuel tank inerting control system 800 which comprises an aircraft fuel tank inerting arrangement 803 for delivering inerting gas to the aircraft fuel tank 11, a temperature input module 801 for acquiring a highest temperature at destination D; and a control module 802 for controlling the operation of the aircraft fuel tank inerting arrangement 803. The control module 802 is also configured to receive an output from the temperature input module 801 dependent on the highest temperature at the intended destination D and to control operation of the aircraft fuel tank inerting arrangement 803 in dependence on the output of the temperature input module. In the present case, the operation of the aircraft fuel tank inerting arrangement 803 is also controlled based on flight-related parameters provided 703 by flight-related parameter module 804.

Many possible methods may be used to determine if it is necessary to provide inerting gas to the fuel tank 11. Typically, the temperature indicative of the highest temperature at the destination D is compared to a pre-determined temperature, for example, the lower flammability limit of the fuel F. If said temperature is lower than the lower flammability limit of the fuel by at least 5° C. (for example), then this is indicative of there being no necessity to provide inerting gas to the fuel tank 11. In deciding whether or not it is necessary to provide inerting gas to the fuel tank 11, in the present example, various flight related parameters are taken into consideration (such as altitude, weather forecast at the destination, temperature as a function of time spent at destination). In the present case, if it is determined that it will not be necessary to provide inerting gas to the fuel tank during the flight, then control module 802 cuts-off power to the aircraft fuel tank inerting arrangement 803, thereby disabling the aircraft fuel tank inerting arrangement 803. This can be done, for example, by removing electrical power from one or more of the components of the fuel tank inerting arrangement 803. Alternatively, the aircraft fuel tank inerting arrangement 803 may effectively be disabled by preventing flow of gas into and/or out of the aircraft fuel tank inerting arrangement. In the present case, aircraft fuel tank inerting arrangement 803 is substantially the same as aircraft fuel tank inerting arrangement 203, shown in FIG. 4.

This will now be discussed by way of example only by reference to FIG. 4. The aircraft fuel tank inerting arrangement is shown generally by reference numeral 203. The aircraft fuel tank inerting arrangement 203 comprises an inlet 502 arranged to receive air from an aircraft engine bleed line (not shown). The air received from the engine bleed line is typically at a temperature of about 350° C. The air passes downstream through a valve 516 and then through an ozone remover 503 which removes ozone from the air. Ozone can cause problems to other components in the aircraft fuel tank inerting arrangement 203, in particular an air separation module 510 which is discussed in more detail in GB2520728 Immediately downstream of the ozone remover 503 is a shut-off valve 504 which is closable to prevent gas moving upstream or downstream of the shut-off valve. The shut-off valve 504 is typically used as a safety valve. Downstream of the shut-off valve 504 is a heat exchanger 505 which cools the gas passing there through, typically from 350° C. to between 50° C. and 100° C. A bypass line 506 is provided which allows a certain proportion of uncooled gas to bypass the heat exchanger 505 and to be mixed with gas treated by the heat exchanger 505. A valve 507 is provided in the bypass line 506 to control the amount of gas that passes through the bypass line 506. The bypass line 506 facilitates the control of the temperature of the gas. A further shut-off valve 508 is provided downstream of the junction where the gases from the bypass line 506 and heat exchanger 505 are mixed. The cooled gas is filtered by an ULPA (ultra low particulate air) filter 509 to remove particulate and then passed to an air separation module 510. The air separation module 510 removes at least some of the oxygen from the gas, with oxygen-depleted air being fed via a flow control valve 512 to an outlet 514 for delivering oxygen-depleted air to a central fuel tank (not shown). The air separation module 510 typically comprises a multiplicity of aligned permeable fibres. The lateral walls of the fibres have a greater permeability to oxygen than nitrogen, and therefore oxygen permeates laterally through the fibres more than nitrogen, thereby reducing the amount of oxygen in the gas stream. The air separation module also comprises an outlet 511 for the egress therefrom of oxygen-enriched air. Such air is usually dumped overboard the aircraft.

The flow control valve 512 is a globe valve and is operable to finely control the amount of oxygen-depleted gas flowing to the outlet 514. The globe valve comprises a plug or disk (not shown) which is movable towards and away from a valve seat (not shown), thereby varying the flow of gas through the valve 512. The valve plug or disk is associated with an actuator (not shown) in the form of a piston that may be used to move the stem (not shown) of the globe valve, and thereby move the plug or disk of the valve towards or away from the valve seat, thereby changing the rate of flow of gas.

A one-way valve 513 is provided downstream of the flow control valve 512. The one-way valve 513 inhibits passage of gas upstream. This is advantageous because it inhibits passage of fuel-bearing gas from the fuel tank to upstream components, such as the heat exchanger 505 which can be hot.

The aircraft fuel tank inerting arrangement 203 is further provided with a flow sensor 531 immediately downstream of the flow control valve 512. The flow sensor 531 determines the gas flow rate immediately downstream of the flow control valve 512. The flow rate determined by the flow sensor 531 is compared with a desired value or range of values which may be determined, for example, by the amount of fuel left in the fuel tank and/or on the stage of the flight (e.g. descent, climb or level flight). The difference between the measured value and desired value may be used to control the actuator associated with the flow control valve 512. For example, if the flow rate is too high, the actuator may be used to close the valve, thereby reducing the flow rate. The use of such a flow control valve 512 enable the fine control of the amount of gas passing through the air separation module, thereby reducing the frequency with which it has to be replaced.

Control module 802 is arranged to control valve 516 which controls the supply of air into the aircraft fuel tank inerting arrangement 803. If it has been determined that it is not necessary to provide inerting gas to the fuel tank 11, then the control module 802 causes control valve 516 to be closed, thereby disabling the aircraft fuel tank inerting arrangement 803.

In many cases, it is expected that it will be necessary to provide inerting gas to the fuel tank, dependent on the highest temperature at destination D. If the aircraft 10 is in flight, heading to destination D, and it is determined that inerting is needed, then inerting gas may be provided to fuel tank 11, typically in the later stages of cruise flight, or on descent, landing and/or taxiing. Inerting gas is generated using bleed air from the engines, so it is necessary for the engines to be running to generate the inerting gas.

EP3037353A1 discusses various flight-related parameters which may be used to help determine if it is necessary to provide inerting gas to a fuel tank, particularly in paragraph [0011], and this teaching of EP3037353A1 is incorporated herein by reference.

The example discussed with reference to FIGS. 5a, 5b and 6 uses a temperature predicted using data (e.g. statistical data) relating to the temperature at the destination as a function of date and time in order to provide said temperature. The highest temperature at the destination may be a mean, modal or median temperature, for example, a mean maximum daily temperature. Alternatively, the temperature may be a centile temperature, for example a high centile, such as the $90^{th}$ centile for the maximum daily temperature at destination D. This allows the user to allow for a "worst-case" scenario.

Figure 7:
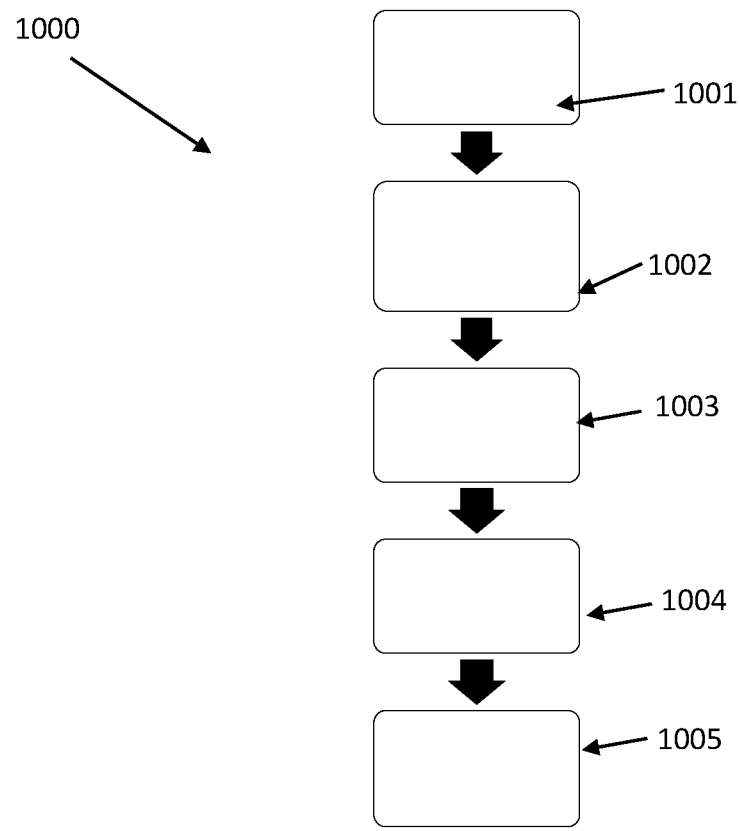
FIG. 7 shows a schematic view of a method of adapting an aircraft according to another embodiment of the invention.

An exemplary method 1000 of adapting an aircraft in accordance with an embodiment of the eighth aspect of the present invention will now be described by way of example only with reference to FIG. 7. The method 1000 of adapting the aircraft comprises estimating 1001 the whereabouts of the aircraft over a period of at least 4 weeks, providing 1002 a temperature reflective of the aircraft's estimated whereabouts over said period, based on said temperature, determining 1003 whether or not it is necessary to provide inerting gas to the fuel tank, and based on said determination, determining 1004 whether or not to remove one or more parts of the aircraft fuel tank inerting arrangement, and if said determination is that one or more parts of an aircraft fuel tank inerting arrangement could be removed, then removing 1005 one or more parts of an aircraft fuel tank inerting arrangement.

In this example, the aircraft is located in Oslo, Norway in November, and typically operates routes within the mainland Nordic countries (Denmark, Sweden, Norway and Finland). The estimated whereabouts are therefore Denmark, Sweden, Norway and Finland. In this example, the temperature indicative of the estimated whereabouts is taken to be the temperature in Copenhagen. This city is close to the most southerly point of estimated whereabouts and is a good approximation of the warmest part of the estimated whereabouts. The mean maximum daily temperature in Copenhagen is 8° C. in November 4° C. in December and 3° C. in January and February. Based on the highest average high temperature of 8° C. throughout this four-month period, it is determined that it will not be necessary for inert the aircraft fuel tank throughout this four-month period, and it is decided that the air separation module should be removed from the aircraft fuel tank inerting arrangement. This results in a substantial weight reduction in the aircraft and reduces fuel consumption.

Those skilled in the art will realise that it is not necessary to use a four-month temperature period to make the determination. A shorter period (e.g. 4 weeks) or a longer period (e.g. 6 months) may be used.

Those skilled in the art will realise that one need not to use a worst-case/warmest-case approximation of the temperature which is reflective of the aircraft's estimated whereabouts.

The example above illustrates that the air separation module may be removed. Those skilled in the art will realise that the example may be applied to a catalyst-based inerting system. In that case, the catalyst may be removed.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of controlling inerting in an aircraft comprising a refueled aircraft fuel tank and an aircraft fuel tank inerting system, the aircraft having an immediately forthcoming flight, the method comprising:
   providing a temperature value indicative of a temperature of fuel after refueling by measuring the temperature before commencing the immediately forthcoming flight;
   based on the temperature, determining whether or not to disable the aircraft fuel tank inerting system for substantially all of the immediately forthcoming flight, and
   based on the determination, and prior to the immediately forthcoming flight, either disabling the aircraft fuel tank inerting system by (i) removing one or more parts of the aircraft fuel tank inerting system to only disable the aircraft fuel tank inerting system, (ii) cutting-off power to the aircraft fuel tank inerting system to only disable the aircraft fuel tank inerting system or (iii) preventing flow of gas into and/or out of the aircraft fuel tank inerting system to only disable the aircraft fuel tank inerting system, or not disabling the aircraft fuel tank inerting system.

2. An aircraft fuel tank inerting control system performing the method of controlling the inerting as claimed in claim 1.

3. The aircraft comprising a fuel tank and the aircraft fuel tank inerting control system in accordance with claim 2, the aircraft fuel tank inerting control system being configured to control delivery of inerting gas to the fuel tank.

4. A non-transitory computer-readable medium having a series of computer-executable instructions embodied thereon, when executed, to perform one or more steps of the method of claim 1.

5. The method according to claim 1, wherein providing the temperature value comprises measuring the temperature of the fuel in the refueled aircraft fuel tank during or after the refueling.

6. The method according to claim 1, wherein determining whether or not to disable the aircraft fuel tank inerting system comprises comparing the temperature value with a predetermined temperature value, the predetermined temperature value being related to a property of the fuel.

7. The method according to claim 6, wherein the comparison comprises calculating a difference between the predetermined temperature value and the temperature value, and if the temperature value is lower than the predetermined temperature value by at least a certain margin, then providing an indication of there being no need to provide the refueled aircraft fuel tank with inerting gas.

8. The method according to claim 1, wherein determining whether or not to disable the aircraft fuel tank inerting system comprises considering one or more flight-related parameters selected from a group consisting of predicted flight plan, predicted maximum aircraft altitude, predicted ascent time, predicted descent time, a temperature indicative of destination temperature, air temperature at a predicted landing time, a temperature indicative of a local temperature, local air temperature before take-off, predicted time before take-off, predicted distance of flight, predicted flight time, amount of fuel in one or more fuel tanks before take-off, whether or not inerting gas was provided in an immediately-preceding flight, and predicted amount of fuel in the one or more fuel tanks.

9. The method according to claim 1, wherein based on the determination, either disabling the aircraft fuel tank inerting system by (i) removing the one or more parts of the aircraft fuel tank inerting system or (ii) cutting-off the power to the aircraft fuel tank inerting system, or not disabling the aircraft fuel tank inerting system.

* * * * *